Sept. 20, 1966    C. M. WESTBROOK ETAL    3,273,387
TORQUE METER
Filed May 25, 1964    2 Sheets-Sheet 2

INVENTORS
Carl M. Westbrook
Loyal H. Hess
ATTORNEYS

United States Patent Office 3,273,387
Patented Sept. 20, 1966

3,273,387
TORQUE METER
Carl M. Westbrook and Loyal H. Hess, Beloit, Wis., assignors to Beloit Corporation, Beloit, Wis., a corporation of Wisconsin
Filed May 25, 1964, Ser. No. 369,794
4 Claims. (Cl. 73—136)

The present invention relates to improvements in torsion measuring devices and more particularly to such a device which can measure the torque in a rotating or stationary shaft, using a pressurized fluid supply and measuring effect on the pressure for gauging changes in torsion.

The present invention contemplates providing measuring torsion in a shaft having a central bore with a rod extending into the bore and connected at its inner end to the shaft, nozzle members supported on the outer end of the rod and positioned diametrically opposed directly a flow of fluid in a substantially circumferential direction, surface members having planar surfaces facing said nozzles for impeding flow therefrom, means for continually delivering fluid under constant pressure to the nozzles, and pressure responsive means indicating variation in pressure occurring in the delivering means by back pressure caused by change in the distance from the nozzles to the surface members.

When a shaft or other structural body is acted on by two or more sets of opposing couples it suffers a twist and every section of the shaft or body between the couples is subjected to a twisting moment, or torque. Since the amount of twist suffered by the shaft is related to the magnitude of the couples, it is apparent that if the angle of this twist is measured and certain other physical properties of the shaft are known, such as the modulus of elasticity, its diameter, and the distance over which the twist is measured, then the amount of power being delivered by it can be calculated when the torque and the speed of the shaft are known.

Accordingly, it is an object of the present invention to provide an apparatus for measuring the amount of twist suffered by a structural body such as a shaft, the amount of torque acting on the body, and the amount of power being delivered by it in accordance with these factors.

It is a further object of the invention to provide an improved torque measuring device which will not be adversely affected and which will not give an erroneous reading when the shaft is also subjected to lateral bending forces.

A further object of the invention is to provide an improved torsion measuring device which is very simple in operation and uses a flow of air under pressure for measuring change in torsion avoiding the necessity for providing complex electrical equipment, and wherein the air flow circuits are arranged so that they will operate continuously in adverse environments without becoming stopped or damaged.

A still further object of the invention is to provide an air flow arrangement for a torque measuring device with improved simplified relationships between the air escape nozzles and the impeding surfaces whereby improved reliability is obtained, a more compact unit is available, and improved adjustment features are provided.

Other objects, advantages, and features will become more apparent with the teaching of the principles of the invention in connection with the disclosure of the preferred embodiments thereof in the specification, claims and drawings, in which:

FIGURE 3 is a vertical sectional view taken substantially along line III—III of FIGURE 1;

FIGURE 5 is an enlarged detailed fragmentary sectional view taken substantially along line V—V of FIGURE 2.

As shown on the drawings:

Figure 1:
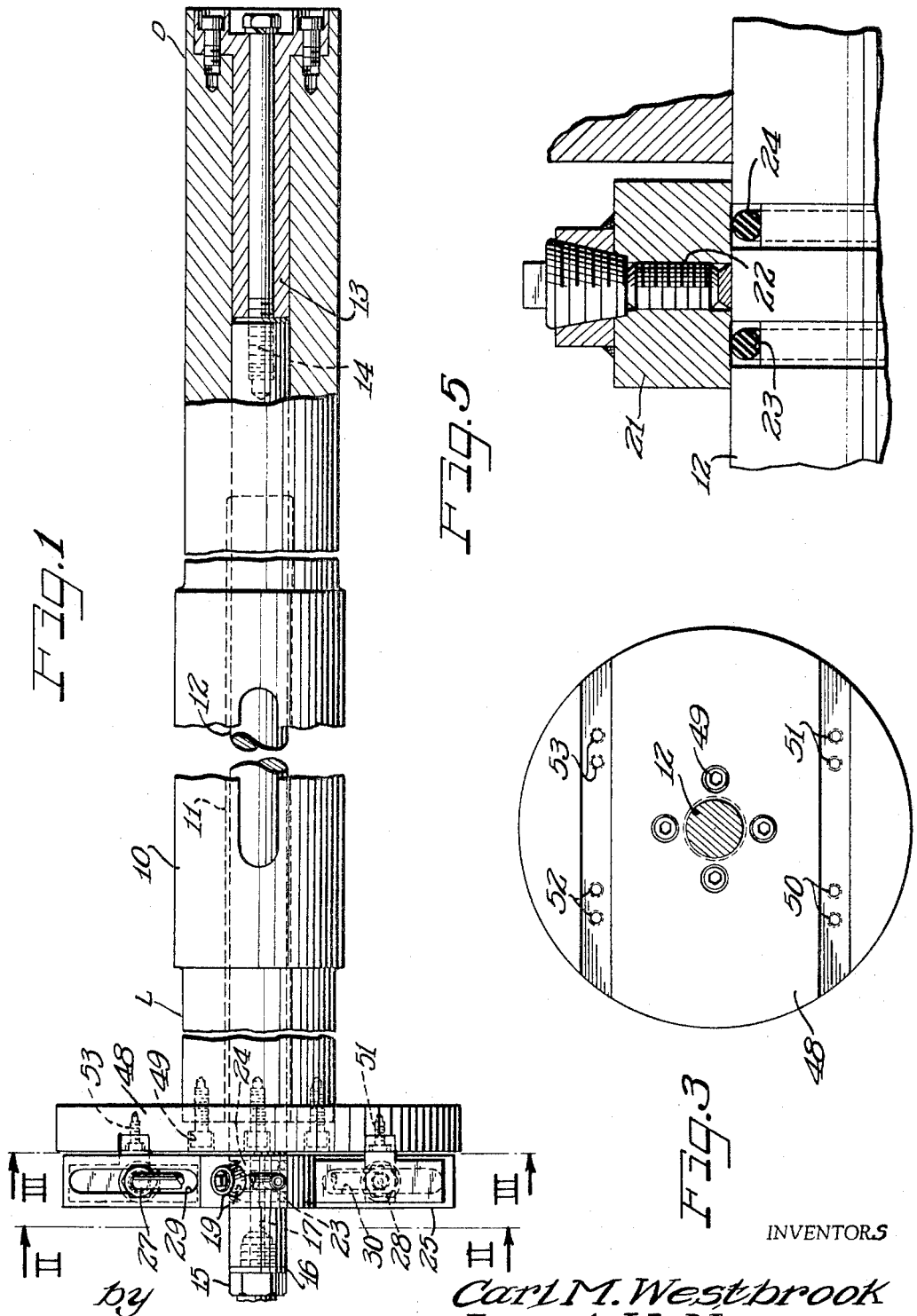
FIGURE 1 is a side elevational view, with parts removed, of a shaft and a torsion measuring device constructed and operating in accordance with the principles of the present invention.

FIGURE 1 shows a shaft 10 having an axial bore 11 therethrough. Positioned within the bore is a rod 12 which is suitably secured to the shaft at its inner end. As shown a plug 13 is anchored to the inner end of the shaft and is axially drilled to receive a bolt 14 which threads into the rod 12 to anchor it in place at its inner end.

Figure 4:
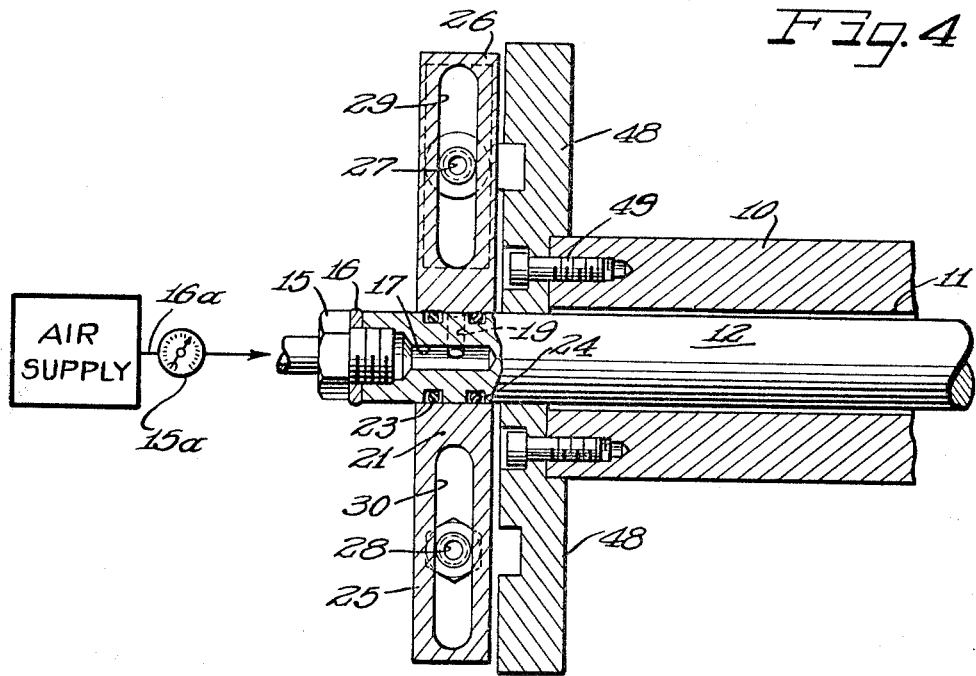
FIGURE 4 is a fragmentary view with parts broken away showing internal structural features of the mechanism.

At the outer end of the rod 12 is a rotary fitting 15 which connects to an air line 16a, FIGURE 4, provided with a continuous flow constant pressure air supply. An air gauge 15a is connected to the line to measure drop or increase in air line pressure with change in flow, in accordance with the principles of the present invention. A pressure drop orifice may be positioned in the line upstream of the air gauge 15a so that pressure changes will occur over a wider range with change in flow as will be caused by change in torsion on the shaft.

Torsion on the shaft is caused by applying a torsional load at one end as illustrated schematically at L and a torsional drive force is indicated schematically at D at the other end. This will cause a relative twist in the shaft 10 and since the rod 12 is under no load relative twisting or rotation will occur between the rod and shaft at the load end L.

Figure 2:
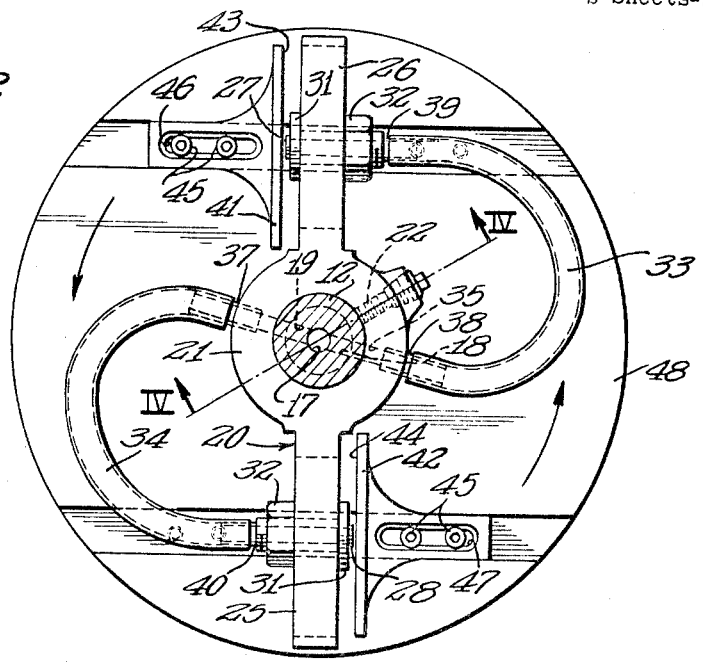
FIGURE 2 is a vertical sectional view taken substantially along line II—II of FIGURE 1.

The rotary fitting 15 is provided with a rotary seal 16 and air delivered to the rod flows through an axial passage 17 and out through outlet openings 18 and 19, FIGURES 1, 2 and 4. The rod 12 has a cylindrical surface at its outer end, and a surface member support 20 is mounted on the rod, having an inner cylindrical surface. The support 20 has a hub 21 and its inner cylindrical surface fits snugly onto the rod. The support 20 is locked on the rod in an adjusted rotational position by a set screw 22 which threads radially into the hub 21 and engages the rod 12.

Axially spaced on each side of the rod air outlet openings 18 and 19 are annular seals 23 and 24 positioned in grooves on the rod. These seals may be of the O-ring type so that the support 20 may easily be slipped in place and may be rotated to its relative adjusted position for locking.

The support 20 has radially extending arms 25 and 26 which support air nozzles 27 and 28 thereon. The air nozzles are mounted in radial slots 29 and 30, FIGURE 4, and extend therethrough to be locked in a radial position where they are equidistant on the shaft axis. The arms 25 and 26 are also positioned so that the nozzles will be diametrically opposed. The nozzles are arranged so that the flow of air issuing therefrom is directed in a substantially circumferential direction with the nozzles pointed in the same circumferential direction relative to the shaft axis.

For locking the nozzles in their proper radial position, they are provided with collars 31 which are located at one side of the arms 25 and 26, and with securing nuts 32 which pull the collars tight against the arms.

Air is fed up from the rod to the nozzles through flexible hoses 33 and 34 which fit over pipe stubs 37 and 38 on the support hub. The pipe stubs communicate with inlet openings 35 and 36 in the hub, which are in communication with the outlet openings 18 and 19 in the rod.

The rod can be set by its supporting bolt 14 on its inner end so that it is in the proper position where the openings 18 and 19 will align with the openings 35 and 36, permitting some additional adjustment by use of the set screw 22. Also it is possible to use an annular groove communicating with the inlets 18 and 19 so that the rod can be positioned in any rotational position, and the support 20 adjusted thereon without rotationally aligning the openings.

For impeding the flow of air from the nozzles 27 and 28, surface members 41 and 42 are provided having flat planar surfaces 43 and 44 positioned at right angles to the direction of flow of air from the nozzles. The surface plates 41 and 42 are positioned so that the surfaces 43 and 44 are equidistant from the nozzles 27 and 28, and are parallel, each being normal to the air flow. With this arrangement if lateral bending of the shaft occurs, it would tend to bring one of the nozzles closer to its surface, and the other nozzle further away from its surface so that the resultant effect on the flow of air is equalized. Thus lateral bending can occur without causing an erroneous torque reading.

The surface members 41 and 42 are supported on a surface member supporting plate 48 by bolts 45 which extend through slots 46. The slots extend parallel to the direction of air flow from the nozzles 27 and 28 so that adjustment of the plate will adjust the distance between the surfaces 43 and 44 and the nozzles.

The plate 48, FIGURES 1 and 3, is secured to the end of the shaft by cap screws 49 threaded into axial holes in the shaft end and extending through holes in the plate.

The plate is provided with threaded mounting holes for supporting the surface members 41 and 42, with the holes being located in sets on each side of the nozzle supporting arms 25 and 26. This permits mounting the nozzles to direct air in either direction, depending upon which way the load is applied to the shaft and which way it will twist with torsion. Preferably a load is applied to the shaft so that the distance between the surfaces and the nozzle will increase with load. Thus, in FIGURE 2, the loads of the shaft will tend to twist the plate 48 in a counterclockwise direction away from the nozzles 27 and 28. However if the shaft were arranged so that the load would be applied in the opposite rotational direction, the nozzles could easily be reversed by pulling the hose lines 33 and 34 off of their fittings 37 and 38 and reverse their direction attaching them to each others fittings. The surface members 41 and 42 would then be mounted on the opposite sides of the arms 25 and 26 so that they would be in the way of the nozzles in their reversed direction. For example, holes 50 and 51, FIGURE 3, are provided on each side of the arm 25, and holes 52 and 53 are provided on each side of the arm 26.

In operation, as a load is applied to the shaft, the nozzles 27 and 28 will remain stationary on their support 20, and the inner end of the shaft will twist relative to the rod 12 thereby relatively rotating the plate 48 and relatively moving the surfaces 43 and 44 away from the nozzles. This will cause a drop in pressure in the line which will be registered by the gauge 15a, FIGURE 4, either in terms of pressure or in converted terms of torsion, or horsepower load on the shaft.

Thus it will be seen that we have provided an improved torque measuring device which meets the objectives and advantages above set forth. The mechanism is relatively simple and rugged in structure and capable of being used on either stationary or rotating shafts. The mechanism is also well adapted to being used in the presence of foreign elements such as dust or moisture without adversely affecting its operation.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A device for measuring torsion in a shaft comprising,
   first and second fluid flow units each having a nozzle member positioned to direct a flow of fluid in a direction circumferentially of the shaft axis and a surface member facing said nozzle member for impeding flow therefrom, and mounting means for supporting the members on the shaft with the nozzle member being supported from one location at the shaft and the surface member being supported from another location axially spaced from said one location so that relative rotational movement occurs with torsion in the shaft,
   means for continuously delivering fluid under constant pressure to the nozzle members, and pressure responsive means indicating variation in pressure occurring within said delivering means by back pressure caused by change in distance between said nozzle members and said surface members,
      said first and second units spaced diametrically opposite relative to the shaft axis so that lateral bending of the shaft will simultaneously increase flow in one nozzle member and decrease flow in the other nozzle member thereby avoiding error in torsion measuring due to lateral bending.

2. A device for measuring torsion in a shaft having a central bore comprising,
   a rod means extending into said bore and connected at one end to the shaft,
   a nozzle support mounted on the other end of said rod with first and second nozzle orifices radially outwardly of the shaft axis diametrically opposed and opening in a general circumferential direction,
   a surface member support mounted on said shaft having planar surfaces normal to the flow from said orifices,
   means for delivering fluid under constant pressure to said nozzle orifices,
   and pressure responsive means indicating variation in pressure occurring within said delivering means by back pressure caused by change in the distance from said nozzle orifices to said surface members.

3. A device for measuring torsion in a shaft having a central bore comprising,
   a rod means extending into said bore and connected at its inner end to the shaft,
      said rod means having a cylindrical outer end and having an axial fluid flow passage at the outer end with an outlet opening radially,
   a nozzle support on the outer cylindrical end of the rod means having an inlet passage communicating with said rod outlet opening, spaced circumferential seals between the rod means and said nozzle support on each side of the rod outlet opening,
   means for adjustably locking the nozzle support to the rod in a predetermined rotational position relative to the rod,
   nozzle orifices on said nozzle support for directing a flow of fluid substantially circumferentially and connected to the nozzle inlet passage,
   and a surface member support on said shaft having surface members facing said nozzle orifices.

4. A device for measuring torsion comprising in combination,
   a shaft having a central bore therein,
   a rod within said bore secured at its inner end to the shaft and having a cylindrical outer end with an axial air emit passage and a radial air outlet opening, a rotational fitting for delivering air under pressure to said inlet passage at the outer end of the rod, a nozzle support having a cylindrical bore for mounting on the outer end of the rod, an air inlet opening and the support communicating with the outlet opening in the rod, a pair of spaced annular seals around the rod spaced axially with the rod outlet opening therebetween, means for locking the nozzle support in an adjusted rotational position, nozzle orifices on the nozzle support diametrically opposed and equally spaced from the shaft axis, means for adjusting the radial position of the nozzles, flexible hoses connecting between the air inlet opening and the support and said nozzles, constant pressure continual air supply means connected to said rotary fitting for directing a continual flow of air through said nozzles, a surface plate secured to the shaft beside said nozzle support, surface members having planar surfaces facing said nozzles mounted on said plate, and means for adjusting the position of said surface members parallel to the direction of air flow from said nozzles for positioning the surface members uniformly from the nozzles.

References Cited by the Examiner

UNITED STATES PATENTS

| | | | |
|---|---|---|---|
| 2,635,465 | 4/1953 | White | 73—136 |
| 3,069,902 | 12/1962 | Crosby | 73—136 |
| 3,079,788 | 3/1963 | Trotin | 73—59 |

RICHARD C. QUEISSER, *Primary Examiner.*

C. A. RUEHL, *Assistant Examiner.*

Disclaimer and Dedication

3,273,387.—*Carl M. Westbrook*, and *Loyal H. Hess*, Beloit, Wis. TORQUE METER. Patent dated Sept. 20, 1966. Disclaimer and Dedication filed Sept. 4, 1979, by the assignee, *Dana Corp.*

Hereby disclaims and dedicates to the Public the remaining term of said patent.

[*Official Gazette November 16, 1982.*]